(12) United States Patent
Arnett et al.

(10) Patent No.: US 10,588,462 B2
(45) Date of Patent: Mar. 17, 2020

(54) BEARING MOUNT FOR BLADE ASSEMBLY

(71) Applicant: Vita-Mix Management Corporation, Olmsted Township, OH (US)

(72) Inventors: Michael P. Arnett, Columbia Station, OH (US); Nathaniel D. Palella, Parma, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 32 days.

(21) Appl. No.: 15/577,413

(22) PCT Filed: May 31, 2016

(86) PCT No.: PCT/US2016/034977
§ 371 (c)(1),
(2) Date: Nov. 28, 2017

(87) PCT Pub. No.: WO2016/196442
PCT Pub. Date: Dec. 8, 2016

(65) Prior Publication Data
US 2018/0168402 A1    Jun. 21, 2018

Related U.S. Application Data

(60) Provisional application No. 62/168,392, filed on May 29, 2015, provisional application No. 62/198,965, filed on Jul. 30, 2015.

(51) Int. Cl.
*A47J 43/07* (2006.01)
*A47J 43/046* (2006.01)
(Continued)

(52) U.S. Cl.
CPC ......... *A47J 43/0716* (2013.01); *A47J 43/046* (2013.01); *B01F 7/20* (2013.01);
(Continued)

(58) Field of Classification Search
CPC . A47J 43/046; A47J 43/0716; B01F 15/0048; B01F 2015/0011;
(Continued)

(56) References Cited

U.S. PATENT DOCUMENTS 2,530,455 A * 11/1950 Forss ............... A47J 43/046
241/282.1
2,585,255 A *  2/1952 Kochner ........... A47J 43/046
241/282.1
(Continued)

FOREIGN PATENT DOCUMENTS

CN    201147238 Y    11/2008
JP    2012254126 A    12/2012

OTHER PUBLICATIONS

Patent Cooperation Treaty (PCT), International Search Report and Written Opinion for Application PCT/US2016/034977 filed May 31, 2016, dated Sep. 16, 2016, International Searching Authority, US.

*Primary Examiner* — Tony G Soohoo
(74) *Attorney, Agent, or Firm* — McDonald Hopkins LLC (57) ABSTRACT

A blender with a blending assembly is shown and described. The blender may include a container and a blending assembly attached thereto. The blending assembly may include a blade, an axle, and a thick, molded bearing mount. The bearing may include a stiffening portion and a thick molded portion. The blending assembly may include a vibration dampening member. The vibration dampening member may be positioned to isolate the bearing mount and/or a bearing housing from other components.

19 Claims, 6 Drawing Sheets

(51) Int. Cl.
    *F16C 27/02* (2006.01)
    *B01F 7/20* (2006.01)
    *B01F 15/00* (2006.01)
    *F16C 35/02* (2006.01)
(52) U.S. Cl.
    CPC .......... *B01F 15/0048* (2013.01); *F16C 27/02* (2013.01); *F16C 35/02* (2013.01); *B01F 2015/0011* (2013.01); *B01F 2015/00597* (2013.01)
(58) Field of Classification Search
    CPC .. B01F 2015/00597; B01F 7/20; F16C 27/02; F16C 35/02
    See application file for complete search history.

(56) References Cited

U.S. PATENT DOCUMENTS

| | | | | |
|---|---|---|---|---|
| 2,750,162 | A * | 6/1956 | Kircher | A47J 43/07 220/632 |
| 2,755,900 | A * | 7/1956 | Seyfried | F16D 3/68 192/108 |
| 2,804,289 | A * | 8/1957 | Schwaneke | A47J 43/046 366/197 |
| RE24,607 | E * | 2/1959 | Seyfried | F16D 3/68 192/108 |
| 2,940,738 | A * | 6/1960 | Posener | A47J 43/046 241/282.1 |
| 2,992,715 | A * | 7/1961 | Blachly | A47J 43/046 192/108 |
| 3,064,949 | A * | 11/1962 | Dewenter | A47J 43/046 241/195 |
| 3,344,829 | A * | 10/1967 | Ripple | A47J 43/046 241/282 |
| 3,493,215 | A * | 2/1970 | Main | A47J 43/046 241/282.2 |
| 3,576,039 | A | 4/1971 | Roberts | |
| 3,603,364 | A * | 9/1971 | Samuelian | A47J 43/046 241/199.12 |
| 3,612,126 | A * | 10/1971 | Emmons | A47J 43/0766 192/130 |
| 3,713,628 | A * | 1/1973 | Christensen | A47J 43/046 241/199.9 |
| 3,784,118 | A * | 1/1974 | Hurwitz | A47J 43/046 241/282.1 |
| 3,785,579 | A * | 1/1974 | Voglesonger | A47J 43/0766 241/282.1 |
| 3,978,491 | A | 1/1974 | Hurwitz | |
| 3,881,705 | A * | 5/1975 | Greenspan | A47J 43/046 241/282.1 |
| 3,887,169 | A * | 6/1975 | Maynard | B01F 7/06 366/307 |
| 4,462,694 | A * | 7/1984 | Ernster | B01F 7/00008 241/282.2 |
| 4,889,248 | A * | 12/1989 | Bennett | A47J 43/046 215/390 |
| 5,148,558 | A | 9/1992 | Dunn | |
| 5,584,577 | A * | 12/1996 | Thies | A47J 43/0716 241/282.2 |
| 5,890,238 | A | 4/1999 | Votel | |
| 7,159,257 | B1 | 1/2007 | Struthers | |
| 7,641,380 | B2 * | 1/2010 | Behar | A47J 43/0722 241/282.1 |
| 7,909,501 | B2 * | 3/2011 | Eden | A47J 43/0766 241/37.5 |
| 8,307,478 | B2 | 11/2012 | Patterson et al. | |
| 8,640,279 | B2 | 2/2014 | Koger et al. | |
| 9,101,521 | B2 | 8/2015 | White et al. | |
| 9,393,169 | B1 | 7/2016 | Schiro | |
| 2003/0021487 | A1 | 11/2003 | Lin | |
| 2003/0214877 | A1* | 11/2003 | Lin | A47J 43/0716 366/214 |
| 2005/0099884 | A1* | 5/2005 | Lee | A47J 43/0722 366/205 |
| 2009/0309310 | A1* | 12/2009 | Wilson | A47J 43/0716 277/312 |
| 2012/0018561 | A1* | 1/2012 | Wulf | A47J 43/042 241/285.1 |
| 2012/0027331 | A1* | 2/2012 | Liang | F16C 33/7886 384/477 |
| 2014/0239107 | A1* | 8/2014 | Upston | A47J 43/0722 241/282.2 |
| 2016/0331181 | A1* | 11/2016 | Dickson, Jr. | B01F 7/0025 |
| 2017/0354940 | A1* | 12/2017 | Kolar | B01F 7/162 |
| 2018/0008097 | A1* | 1/2018 | Mehlman | A47J 43/046 |
| 2018/0116463 | A1* | 5/2018 | Reinhard | A47J 43/0716 |
| 2018/0168402 | A1* | 6/2018 | Arnett | A47J 43/046 |
| 2018/0206677 | A1* | 7/2018 | Ivarsson | A47J 43/0716 |

* cited by examiner

BEARING MOUNT FOR BLADE ASSEMBLY

RELATED APPLICATIONS

This application is a 35 U.S.C. 371 national stage filing of PCT Application No. PCT/US2016/034977 filed on May 31, 2016 and entitled "BEARING MOUNT FOR BLADE ASSEMBLY", which claims the benefit of U.S. Provisional Patent Application Ser. No. 62/168,392, filed May 29, 2015, and entitled "BEARING MOUNT FOR BLADE ASSEMBLY," and U.S. Provisional Patent Application Ser. No. 62/198,965, filed Jul. 30, 2015, and entitled "DAMPENING MEMBER FOR BEARINGS OF A BLADE ASSEMBLY," the entireties of which are incorporated herein by reference.

FIELD OF THE INVENTION

The present invention is generally related to a blade assembly and, more particularly, to a bearing mount and dampening member for a blade assembly.

BACKGROUND

Blenders and blending systems are often used to blend and process foodstuffs. Frozen, frosty, or icy drinks have become increasingly popular. Such drinks include the traditional shakes, and the more recently popular smoothies. Shakes, or milk shakes, are typically formed of ice cream and/or milk, and flavored as desired, with or without additives, such as candies, chocolates, peanut butter, fruits, etc. Milkshakes typically are available at most fast-food restaurants, such as burger chains, and may be made by special machines, or hand-made using mixers.

Smoothies tend to be healthier, and may be formed of ice, frozen yogurt, and/or sorbet. Smoothies may include additives such as fruits, fruit juice, vegetables, vitamins, supplements, etc. Smoothies typically are available from specialty chains or juice bars, and may be made with commercial or restaurant-grade blender. Such drinks also may be made at home, using a personal blender.

Blenders traditionally include a blade assembly attached with a container. The blade assembly of these blenders often requires complex geometries or specific geometries to assist in mixing the contents in the container appropriately. The blade assemblies are driven by a motor to rotate blades of the assembly. Rotation of the blades allow for blending of foodstuff and may produce noise. Noise may be due to vibrations created by the operating motor, and vibrations made by other components of the blender.

Various methods are known to reduce the sound created by a blender. One such method includes providing an enclosure around the container of the blender to contain the noise. These enclosures can also increase the size of the blenders. Therefore, a need exists for an improved means for blending contents. Further, there is a need for reducing noise and vibrations during blending of foodstuff.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

The present teachings relate to a blade assembly for a blender and, more particularly, to a bearing mount of a blade assembly. The blender may include a container of any appropriate shape and size. The blade assembly may be disposed within the container. The blade assembly may include a stiffening bearing. The stiffening bearing may include a stiffening member disposed within a molded plastic. The molded plastic may be over molded with a plastic. Exemplary embodiments of the blade assembly are shown in the attached drawings. The blade assembly, however, is not limited to that shown and described herein. It may be of any appropriate configuration.

In an aspect, a blending system may include a blending container that receives foodstuff for blending. A blade assembly may be coupled to the blending container. Bearings may attach to an axle of the blade assembly. The bearings may be housed by a bearing housing. A dampening member may generally isolate the bearing housing from contact with other components.

The following description and the drawings disclose various illustrative aspects. Some improvements and novel aspects may be expressly identified, while others may be apparent from the description and drawings.

DESCRIPTION OF THE DRAWINGS

The accompanying drawings illustrate various systems, apparatuses, devices and methods, in which like reference characters refer to like parts throughout.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

It is noted that the various embodiments described herein may include other components and/or functionality. It is further noted that while various embodiments refer to a blender or a blending system, various other systems may be utilized in view of embodiments described herein. For example, embodiments may be utilized in food processor systems, mixing systems, hand-held blending systems, various other food preparation systems, and the likes. As such, references to a blender, blending system, and the like, are understood to include food processor systems, and other mixing systems. Such systems generally include a blender base that may include a motor, a controller, a display, a memory and a processor. Further, such systems may include a blending container and a blade assembly. The blade assembly, the blending container, and the blender base may removably or irremovably attach. The blending container may be powered in any appropriate manner, such as disclosed in U.S. patent application Ser. No. 14/213,557, entitled Powered Blending Container, which is hereby incorporated by reference. Foodstuff may be added to the blending container. Furthermore, while blending of "ingredients," "contents" or "foodstuffs" is described by various embodiments, it is noted that non-food stuff may be mixed or blended, such as paints, epoxies, construction material (e.g., mortar, cement, etc.), and the likes. Further, the blending systems may include any household blender and/or any type of commercial blending system, including those with covers that may encapsulate or partially encapsulate the blender. Further, commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such.

Moreover, blending of foodstuff or ingredients may result in a blended product. Such blended products may include drinks, frozen drinks, smoothies, shakes, soups, purees, sorbets, butter (nut), dips or the likes. It is noted that various other blended products may result from blending ingredients. Accordingly, terms such as "blended product" or "drink" may be used interchangeably unless context suggests otherwise or warrants a particular distinction among such terms. Moreover, such terms are not intended to limit possible blended products and should be viewed as examples of possible blended products.

In an embodiment, the blender assembly may include a blending container and a blade assembly. The blending container may comprise a pitcher, bowl, cup, or other general shape. It is noted that the blending container may be configured for single serving use, commercial use, multi-serving use, or the like. The blending container may include or be coupled with (e.g., removably or irremovably) a blade assembly. The blade assembly may include one or more blades having one or more wings.

In some blending devices, rotation of blades in a container may produce a large amount of noise that may be unpleasant for a user. For instance, blade assemblies and/or blending containers of the blending devices may vibrate during operation, which may contribute to such noise. The vibration and noise may increase at high speeds or blending of particular ingredients. In another aspect, molding of thick sections or parts for a blade assembly my provide challanges.

As disclosed in the various described embodiments, a blending system may include a container and a blade assembly. The blade assembly may include a thick bearing mount, which may be molded or otherwise formed. The bearing mount may include a stiffening member disposed within an elastomeric material member, such as, including without limitation, a molded plastic member. The molded elastomeric member may be over molded by another elastomeric material, such as by way of a non-limiting example, over molded with a plastic. In an aspect, the stiffening member may stiffen a portion of the blade assembly and/or a blending container. In another aspect, the stiffening member may provide a layer within the bearing mount and may allow for more efficient molding. It is noted that bearing mounts of the disclosed embodiments may alter noise produced by a blending system in comparison to a blending system without the bearing mounts. The altered noise may be altered in at least one parameter (e.g., intensity, pitch, etc.). For instance, disclosed embodiments may provide bearing mounts that reduce noise during operation of a blender system.

In at least one embodiment, a blending system may include a bearing mount and a bearing housing. In another aspect, the blending system may include a dampening member inserted between the bearing mount and the bearing housing. The dampening member may comprise an elastomeric material, including, without limitation, a rubber. This dampening member may form an insert or sleeve that may be disposed between the bearing mount and the bearing housing. The dampening member may be under compression between the bearing housing and the container housing or the bearing mount. The compression may stiffen the dampening member, such that the dampening member is radially and axially rigid. In an aspect, the dampening member may maintain sound and/or vibration dampening properties while providing a stiffened mount. While rubber and plastic are identified herein as potential elastomeric materials, the present teachings may include any kind of elastomeric material, including, without limitation, rubber, plastic, a combination of rubber and plastic, a foam material, a compressed foam material, and any combination of such.

Figure 1:
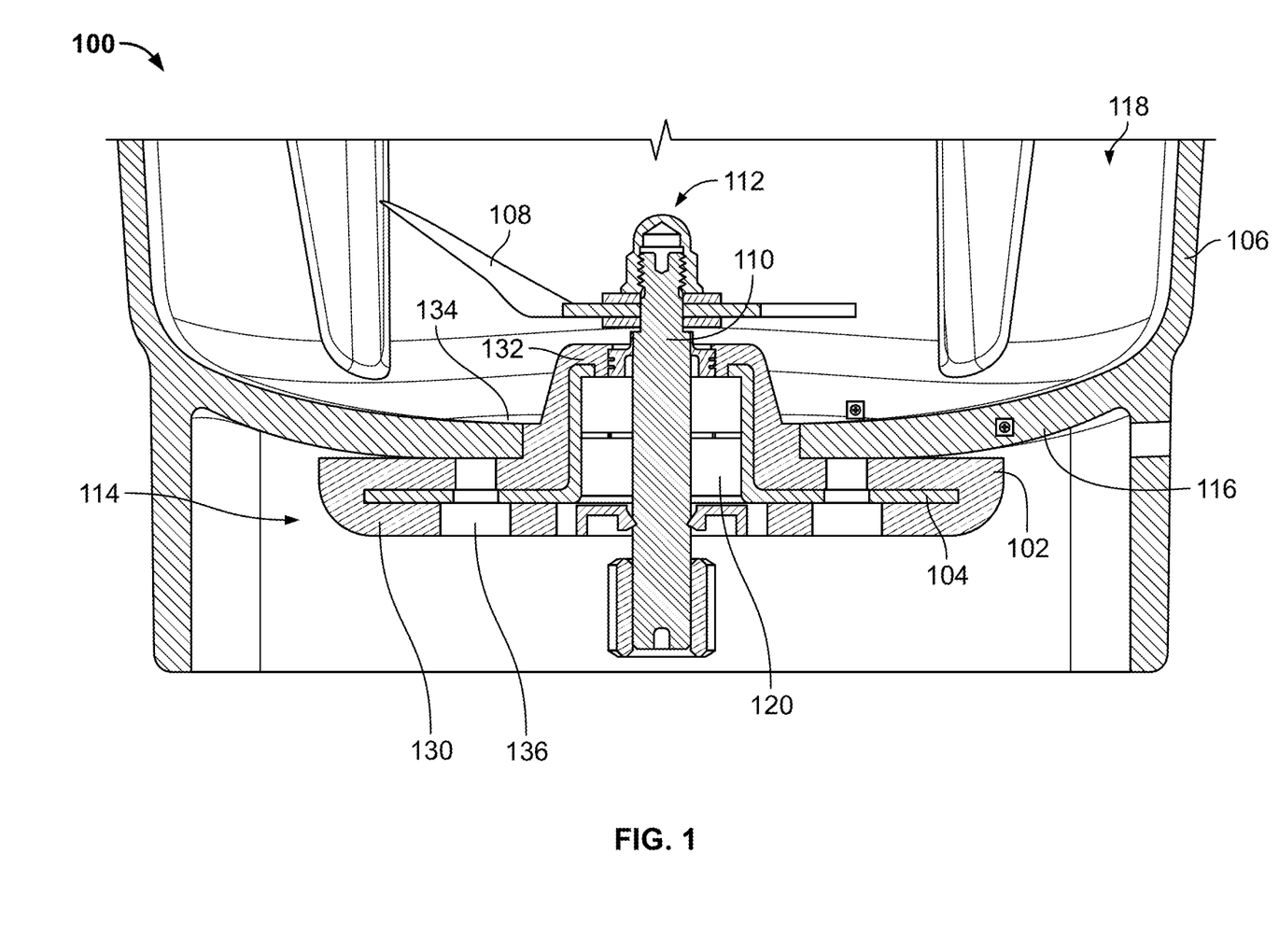
FIG. 1 is a cross-sectional view of at least a portion of a blending system, in accordance with various disclosed aspects.

FIG. 1 illustrates blending system 100, in accordance with various described embodiments. Blending system 100 may primarily include a blending container 106 and a blade assembly 112. Foodstuff may be placed within the blending container 106 and blades 108 of the blade assembly 112 may blend, process, mix, or otherwise agitate the foodstuff. For example, a motor (not shown) may drive axle 110 of the blade assembly 112. The axle 110 may rotate the blades 108. The blades 108 may be removably attached to the axle 110. It is noted that the blades 108 may comprise any desired orientation or configuration and are not limited to those shown and described herein.

Blade assembly 112 may include a bearing mount 114 that may support mounting of a bearing assembly 120. In embodiments, the bearing mount 114 may comprise a generally thick molded bearing mount and may include a stiffening layer or member 104. The stiffening member 104 may comprise a hard or stiff material. The material may include at least one of plastic, metal, or the like. It is noted that the stiffening member 104 may comprise a monolithic construction or may be constructed of a plurality of pieces.

It is further noted that the bearing mount 114 may include a different number of stiffening members.

Bearing mount 114 may comprise a puck or disc-shaped portion 130 and a protrusion portion 132. The disc-shaped portion 130 may be disposed generally beneath or below a first side of a closed end 116 of blending container 106. In at least one embodiment, the protrusion portion 132 may extend through an opening 134 of the closed end 116 and in cavity 118. For instance, the disc-shaped portion 130 may comprise one or more screw or fastener apertures 136 that may operatively receive a fastener (not shown) to secure the bearing mount 114 to the first (e.g., an underside) of the container 106. The protrusion portion 132 may extend through opening 134. In another aspect, the protrusion portion 132 may generally abut or receive the bearing assembly 120, which may include one or more bearings that operatively circumscribe a drive axle 110.

In an aspect, the bearing mount 114 may be of a desired thickness and stiffness and may allow for altered (e.g., reduced) sound during operation of blending system 100. The disclosed bearing mount 114 may reduce vibration of the blade assembly 112 and/or blending container 106 in comparison with other bearing mounts.

Stiffening member 104 may be disposed within a body 102 of the bearing mount 114. It is noted that the shape of the body 102 and/or stiffening member 104 may include a disc-shape having a protrusion as described above. The body 102 may comprise a molded plastic member that may be molded about or around the stiffening member 104. In another aspect, the stiffening member 104 may be otherwise deposited within the molded plastic member. In an example, the body 102 may completely or at least partially surround the stiffening member 104. For instance, the stiffening member 104 may be at least partially exposed to bearing assembly 120. That is, the stiffening member 104 may abut the bearing assembly 120. In another example, the stiffening member 104 may disposed within the body 102 such that the body 102 abuts the bearing assembly 120.

In an aspect, the body 102 may comprise a thick layer relative to the stiffening member 104. The body 102 may be of a consistent thickness or may be of variable thickness. In another aspect, body 102 may comprise a molded plastic member that may be at least partially over molded with another plastic, such as a clear plastic. The over molded plastic may be disposed over at least a portion of the bearing mount 114 and/or container 106. In such an embodiment, the bearing mount 114 may be attached to the container 106 by the over molded plastic. Further still, while the body 102 is described as a plastic material, it may be formed from any appropriate material, including, without limitation, plastic, rubber, metal, or a combination of such.

The stiffening member 104 may comprise a material that is generally stiffer than the material of the body 102. In this manner, the stiffening member 104 may comprise a rigid structure that may, along with body 102, contribute to altering noise produced from vibrations associated with the blade assembly 112 and/or bearing mount 114.

While embodiments may described the bearing mount 114 disposed on or attached to container 106, it is noted that bearing mount 114 may be attached to various other components of a blender system. For instance, bearing mount 114 may be attached to a blade assembly, where the blade assembly may be attached to a container. As an example, single serving blender systems may include a container having an open end and a closed end. The open end may attach to a blade assembly, such as via a spindle or screw top. The blade assembly may include bearing mount 114 and/or other bearing mounts described herein.

Figure 2:
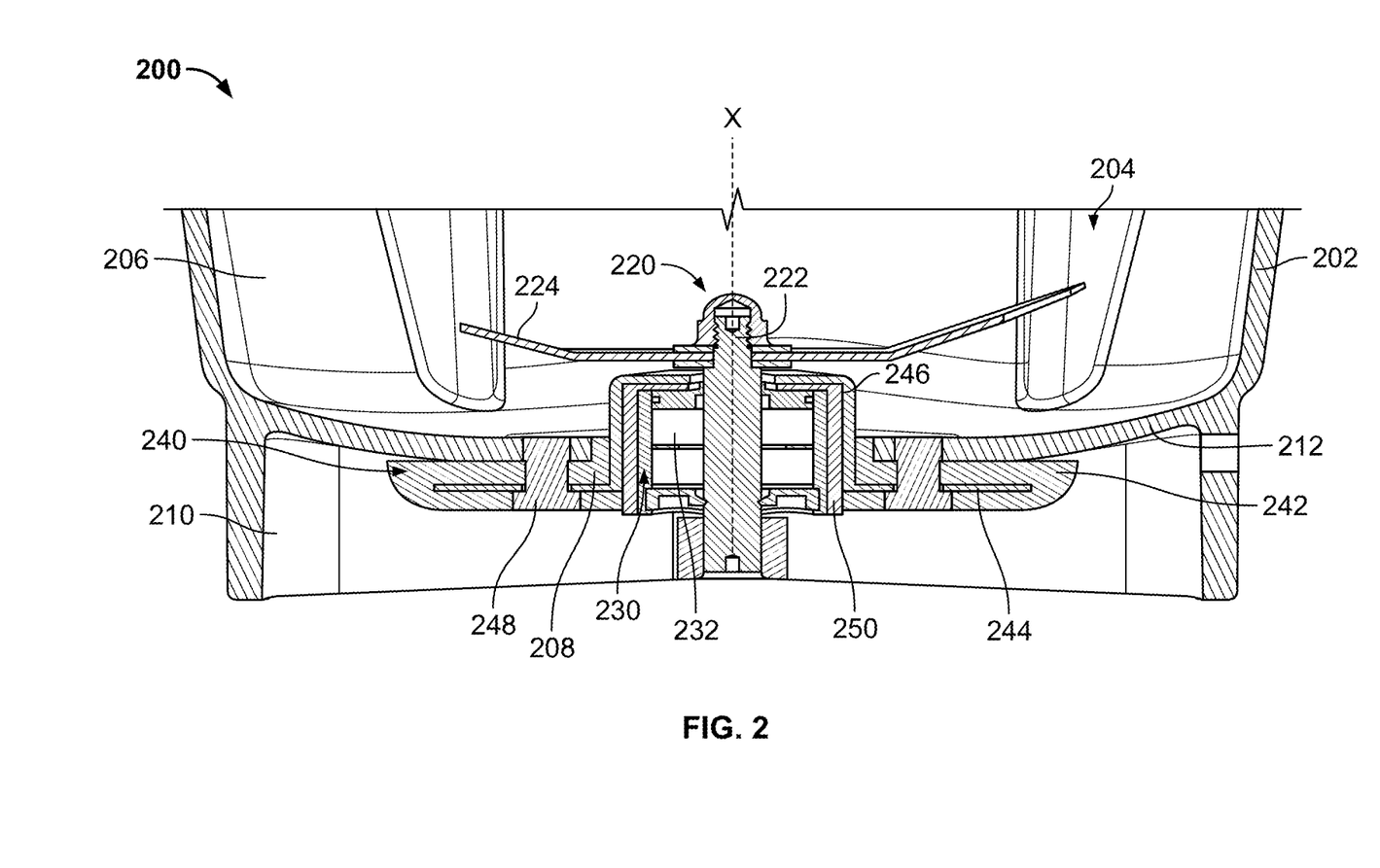
FIG. 2 is a cross-sectional view of at least a portion of a blending system comprising a dampening member and a bearing mount comprising a stiffening member, in accordance with various disclosed aspects.

FIG. 2 illustrates blending system 200, in accordance with various described embodiments. Blending system 200 may primarily include a blending container 202 and a blade assembly 220. The blending container 202 may comprise an appropriate shape. For instance, the blending container 202 may generally represent a bowl, cup, pitcher, or other container. It is further noted that the blending container 202 may comprise various materials such as glass, plastic, metal, or the like. The blending container 202 may comprise a cavity 204 defined by side walls 206 and a closed end 212, which may be a top or bottom of the blending container 202 depending on a desired configuration. The closed end 212 may separate the cavity 204 from a skirt or apron 210. In an aspect, the closed end 212 may comprise an aperture 208 formed therethrough. The aperture 208 may be appropriately sized and shaped to receive the blade assembly 220.

Blade assembly 220 may include a drive shaft or axle 222. The axle 222 may be configured to drive one or more blades 224. The blades 224 may be attached (e.g., removably or irremovably) to the axle 222. In an aspect, a motor may drive the axle 222 to rotate the blade assembly 220. The blades 222 may rotate to chop, mix, or otherwise blend foodstuff within the cavity 204. The blade assembly 220 may rotate at high speeds to effectively blend foodstuff. In an example, the rotation of the blade assembly 220 may generate noise from the motor and/or from vibrations of the blade assembly 220, blending container 202, or other components. For instance, vibrations of the blade assembly 220 may propagate to the blending container 202 and/or a blender base.

In embodiments, a bearing assembly or housing 230 may comprise one or more bearings 232. The bearing housing 230 may surround or encircle the axle 222. In an aspect, the bearing housing 230 may be configured to constrain relative motion of the blade assembly 220 to a desired motion and/or reduce vibration/friction of the blending system 200. The design of the bearing housing 230 may, for example, provide free rotation of the blade assembly around or about an axis X. In another aspect, the bearing housing 230 may support the blade assembly 220 or a portion thereof, such as the axle 222. It is noted that the bearing housing 230 may comprise any number of desired bearings 232.

Blending system 200 may include a bearing mount 240 that may support the bearing housing 230. In an aspect, the bearing mount 240 may be attached to the blending container 202 via one or more supports 248. It is noted, however, that the bearing mount 240 may be attached to the blending container 202 via various other mechanisms and/or may be integrally formed with the blending container 202. It is noted that the bearing mount 240 may be similar to other bearing mounts described herein. For example, the bearing mount 240 may comprise a molded plastic member 242 and a stiffening member 244. The stiffening member 244 may comprise a hard or rigid material that may stiffen and/or increase the rigidity of the bearing mount 240. In at least one aspect, the stiffening member 244 may extend through the aperture 208 to enclose or cover the bearing housing 230 and/or a dampening member 250.

According to at least one embodiment, the blending system 200 may include dampening member 250 disposed between the bearing housing 230 and a bearing mount 240. As depicted, the dampening member 250 may be disposed between the bearing housing 230 and at least a portion of the stiffening member 244 and/or the molded plastic member 242. The dampening member 250 may comprise an elastic, anelastic, viscous, and/or viscoelastic material. For instance, the material may be compressible and may comprise a restorative force. In an aspect, the material may include rubber, plastic (e.g., nylon), leather, fabric, metals and/or alloys, ceramics, foam, sponge, gel, or the like. In another aspect, the material may be suitable for absorbing vibrations and may be compressible. According to at least one embodiment, the material may comprise amorphous polymers, semi-crystalline polymers, biopolymers, or bitumen materials. In an exemplary embodiment, the material may be santoprene or versaflex.

According to at least one embodiment, the blending system 200 may include dampening member 250 disposed between the bearing housing 230 and a bearing mount 240. As depicted, the dampening member 250 may be disposed between the bearing housing 230 and at least a portion of the stiffening member 244 and/or the molded plastic member 242. The dampening member 250 may comprise an elastic, anelastic, viscous, and/or viscoelastic material and include lateral wall 246. For instance, the material may be compressible and may comprise a restorative force. In an aspect, the material may include rubber, plastic (e.g., nylon), leather, fabric, metals and/or alloys, ceramics, foam, sponge, gel, or the like. In another aspect, the material may be suitable for absorbing vibrations and may be compressible. According to at least one embodiment, the material may comprise amorphous polymers, semi-crystalline polymers, biopolymers, or bitumen materials. In an exemplary embodiment, the material may be santoprene or versaflex.

According to at least one embodiment, the dampening member 250 may comprise a rubber insert or sleeve that may be disposed between the bearing mount 240 and the bearing housing 230. The rubber sleeve may be under compression between at least a portion of the bearing housing 230 and at least a portion of the bearing mount 240. The compression/pressure applied may stiffen the rubber sleeve, such that the rubber sleeve is radially and/or axially rigid. In an aspect, the rubber sleeve may maintain sound and/or vibration dampening properties while providing a stiffened mount, with respect to non-compressed rubber. Specifically, the dampening member 250 being under pressure may reduce or eliminate the high frequency noise. It may also provide a sealing effect. The amount of compression and pressure may be controlled and tuned as necessary to reduce the undesired noise. In an example, the rubber sleeve may be positioned between the bearing housing 230 and dampening member 250 when blending system 200 is assembled. In an aspect, the bearing housing 230 and dampening member 250 may compress the rubber sleeve between the bearing housing 230 and dampening member 250. The compression may apply sufficient force to stiffen the rubber sleeve, while allowing the rubber sleeve to maintain elastic and/or viscoelastic properties, such as vibration dampening. The stiffness of the compressed rubber sleeve may make the rubber sleeve radially and axially rigid. The vibration dampening may alter (e.g., reduce) vibration of the blending container 202, side walls 206, a closed end 212, and/or other components of blending system 200. The reduced vibration may decrease noise produced during blending, increase longevity of the blending system 200, and/or otherwise improve user satisfaction.

Moreover, the dampening member 250 may eliminate low frequency by generally keeping the axle 222 straight during operation. In some embodiments, when the axle 222 is generally parallel to the axis X (and perpendicular to a bottom of the container) and it remains stiff, unwanted low frequency sound may be reduced.

Figure 3:
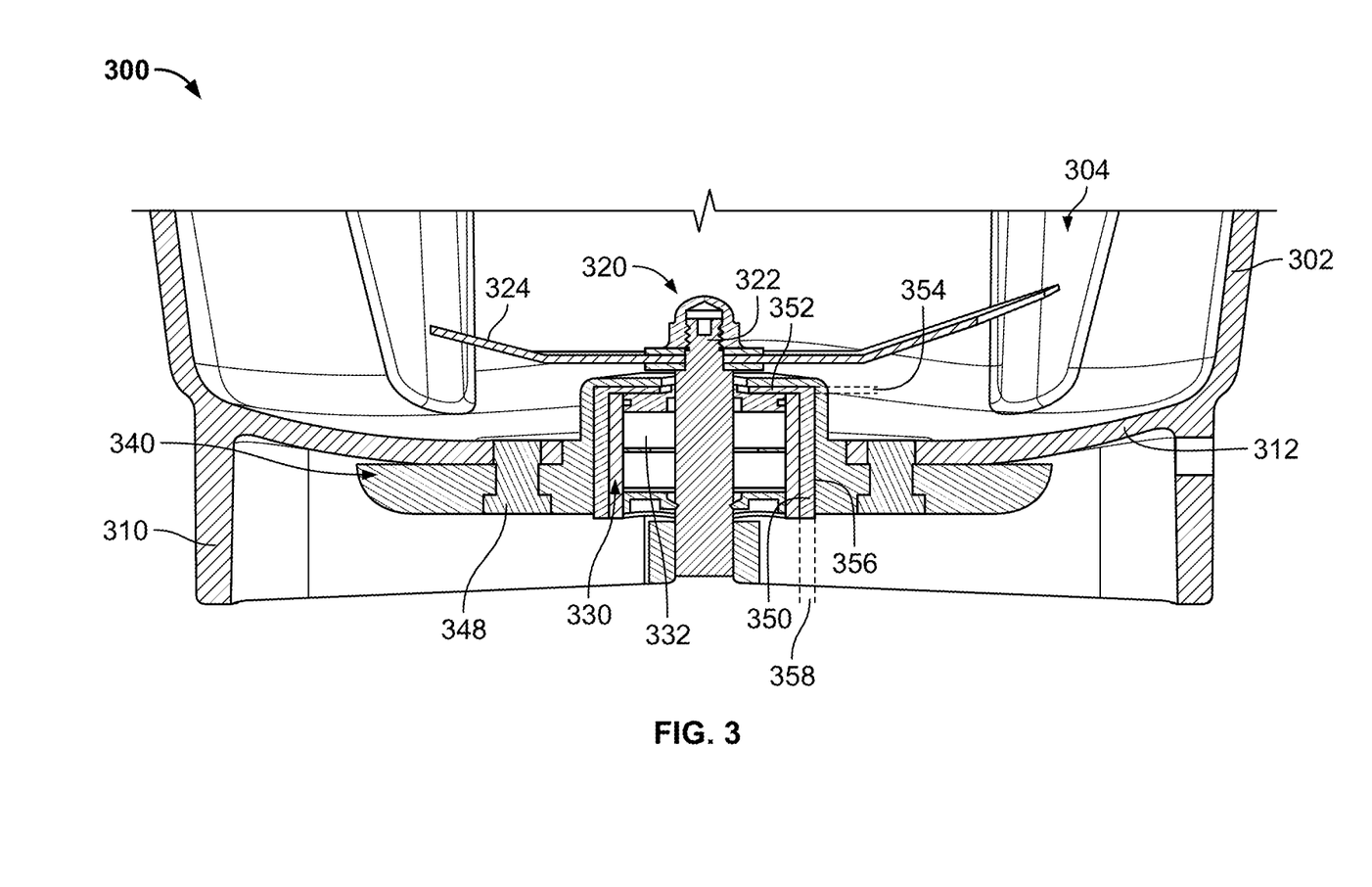
FIG. 3 is a cross-sectional view of at least a portion of a blending system comprising a dampening member and a bearing mount of a monolithic stiffening member, in accordance with various disclosed aspects.

FIG. 3 illustrates blending system 300 that may primarily include a blending container 302, a blade assembly 320, bearing housing 330, a bearing mount 340, and a dampening member 350, in accordance with various described embodiments. It is noted that blending system 300 may comprise similar aspects and/or functionality as disclosed with reference to the other figures described herein. For instance, the blending container 302 may be similar and/or identical to blending container 106 and/or 202.

Blade assembly 320 may include a blade 324 coupled to an axle 322. The blade assembly 320 may be rotated to blend foodstuff within a cavity 304 that may be defined by the blending container 302. The bearing housing 330 may include one or more bearings 332 that may be disposed about at least a portion of axle 322. For instance, the one or more bearings 332 may be generally ring-shaped bearings having apertures configured to receive the axle 322. The bearings 332 may be configured to restrict motion of the blade assembly 320 in one or more directions. For example, the bearings 332 may be configured to restrict wobbling of the axle 322, i.e., spinning of the axle 322 generally that is generally off-center. Wobbling of the axle 322 may generate vibrations which may be transferred to the blending container 302 and bearings 332 may restrict the wobbling and/or vibrations.

A bearing mount 340 may be attached to and/or monolithically formed with a closed end 312 of the blending container 302. For example, one or more fasteners 348 (e.g., pegs, supports, screws, etc.) may couple the bearing mount 340 to the blending container 302. In an aspect, the bearing mount 340 may be configured to support and/or mount the bearing housing 330. The bearing mount 340 may comprise a monolithic or uniform construction. For instance, in comparison with bearing mount 240 of FIG. 2, the bearing mount 340 may not include a stiffening member (e.g., stiffening member 244). In at least one embodiment, the bearing housing 330 may be directly mounted to the blending container 302.

The blending container 302 may comprise an appropriate shape. For instance, the blending container 302 may generally represent a bowl, cup, pitcher, or other container. It is further noted that the blending container 302 may comprise various materials such as glass, plastic, metal, or the like. The blending container 302 may comprise a cavity defined by side walls 306 and a closed end 312, which may be a top or bottom of the blending container 302 depending on a desired configuration. The closed end 312 may separate the cavity 304 from a skirt or apron 310. In an aspect, the closed end 312 may comprise an aperture 308 formed therethrough. The aperture 308 may be appropriately sized and shaped to receive the blade assembly 320.

Dampening member 350 may generally comprise similar aspects as dampening member 250 of FIG. 2. For instance, dampening member 350 may comprise a rubber sleeve disposed between at least a portion of the bearing housing 330 and at least a portion of the bearing mount 340. In an aspect, the dampening member 350 may be compressed between the bearing housing 330 and the bearing mount 340. The compression of the dampening member 350 may be achieved by compression of the bearing mount 340 and bearing housing 330. In another aspect, the dampening member 350 may comprise a distal wall 352 that may comprise a first compressed thickness 354 and a lateral wall 356 that may comprise a second compressed thickness 358. In an aspect, the first compressed thickness 354 of the distal wall 352 may be generally smaller or less than the second compressed thickness 358 of the lateral wall 356. In another aspect, the first and second compressed thicknesses 354 and 358 may be generally smaller or less than respective non-compressed thicknesses of distal wall 352 and lateral wall 356.

Figure 4:
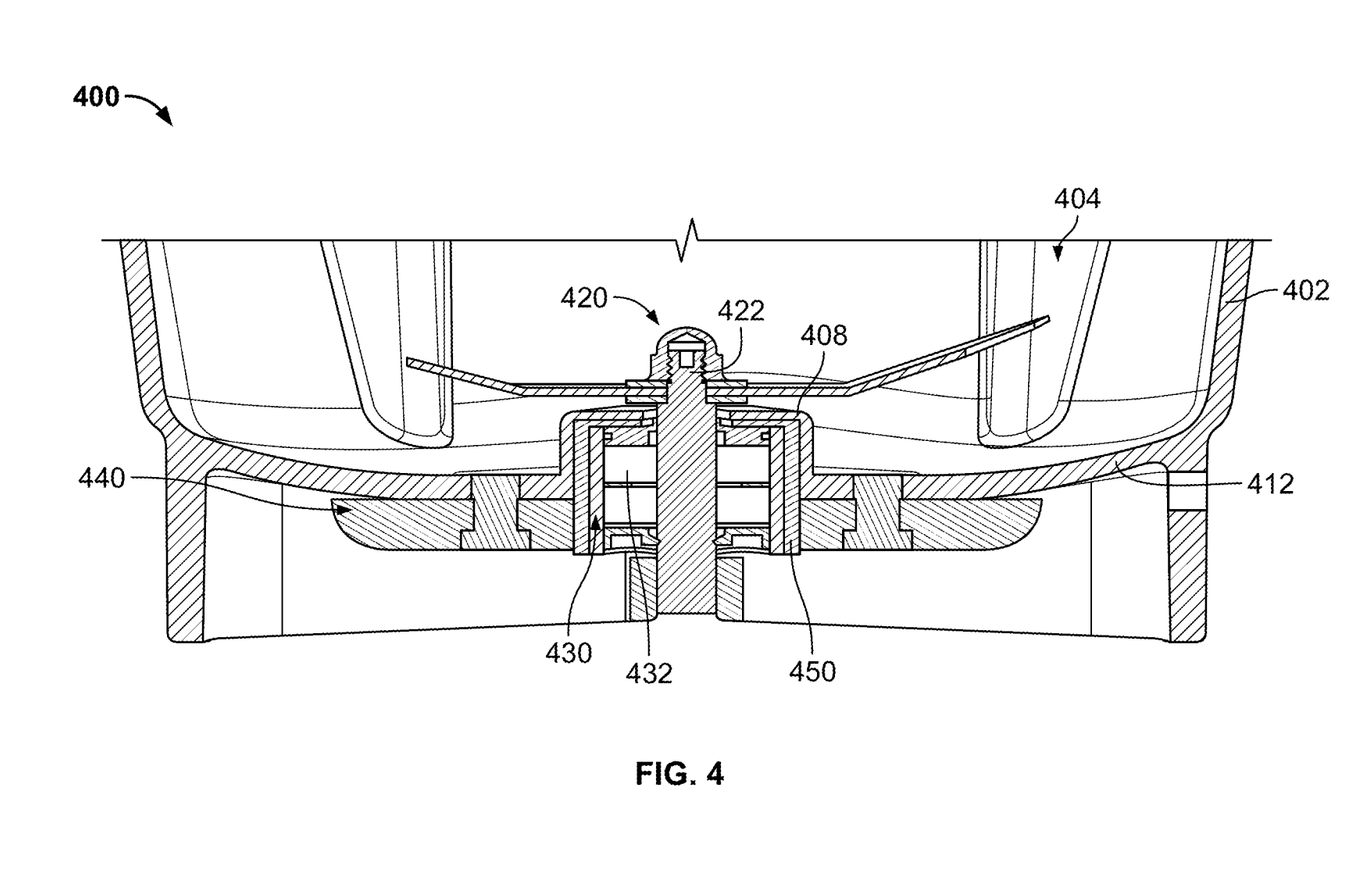
FIG. 4 is a cross-sectional view of at least a portion of a blending system comprising a dampening member in contact with a blending container, in accordance with various disclosed aspects.

Turning to FIG. 4, illustrated is a blending system 400 that may blend foodstuff, in accordance with various disclosed aspects. As described here as well as elsewhere in this disclosure, blending system 400 may comprise similar or identical aspects as the various other described figures. In an aspect, blending system 400 may generally include a blending container 402, a blade assembly 420, bearing housing 430, a bearing mount 440, and a dampening member 450. According to at least one embodiment, the blade assembly 420 may comprise axle 422 that may be received by bearings 432. The bearings 432 may be disposed within the bearing housing 430. The bearing housing 430 may be mounted to the blending container 402 via the bearing mount 440.

In an aspect, the blending container 402 may comprise a closed end 412. The closed end 412 may comprise a protrusion or receiving portion 408. The receiving portion 408 may be configured to receive or house at least a portion of the bearing housing 430. It is noted, however, that the closed end 412 may not include the receiving portion 408. For instance, the closed end 412 may comprise an opening that receives a protrusion of the bearing mount 440, such as similarly described with reference to FIG. 1.

In an at least one embodiment, the dampening member 450 may be disposed between the bearing housing 430, bearing mount 440, and/or the receiving portion 408. In this manner, the dampening member 450 may isolate the bearing housing 430 from contact with other components of blending system 400. For instance, the dampening member 450 may prevent bearing housing 430 from contacting portions of the blending container 402 and/or portions of the bearing mount 440 to alter (e.g., reduce) transmission of vibration from the bearing housing 430 to the blending container 402 and/or bearing mount 440. For instance, dampening member 450 may absorb vibrations from operation of the bearings 432, while providing rigidity to generally limit wobble of the axle 422.

While embodiments may describe reducing transmission of vibrations, it is noted that the dampening member 450 may alter properties of vibrations (e.g., amplitude, frequency, etc.) to reduce generation of perceptible or unpleasant sound. In another aspect, dampening member 450 may be compressed between the bearing housing 430 and at least one of the bearing mount 440 or the receiving portion 408.

It is noted that while bearing mount 440 is depicted as not comprising a stiffening member, it is noted that bearing mount 440 may include a stiffening member similar to blending system 100 and/or 200. For instance, a stiffening member may be formed through at least a portion of the bearing mount 440.

Figure 5:
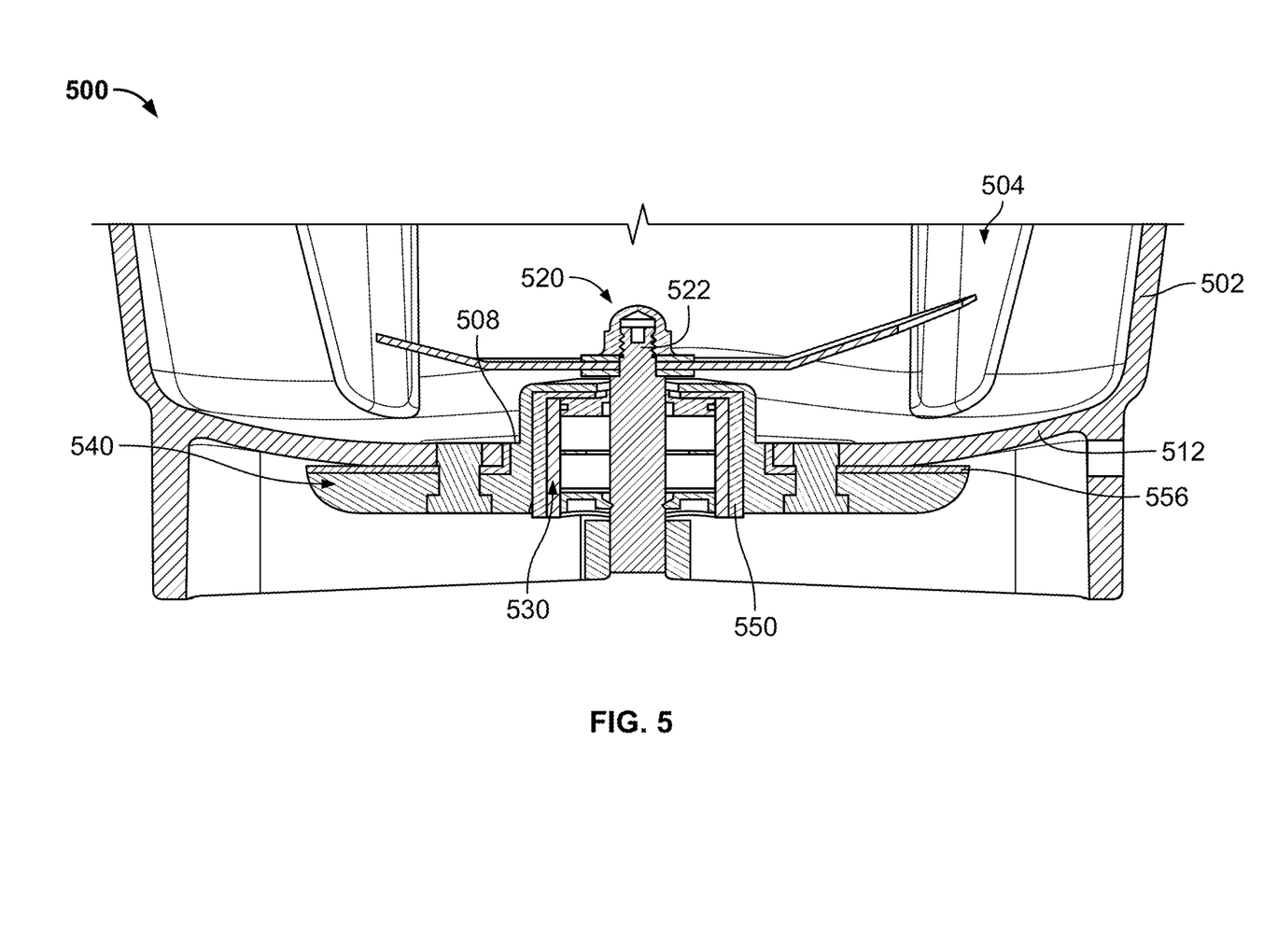
FIG. 5 is a cross-sectional view of at least a portion of a blending system comprising a first and a second dampening member, in accordance with various disclosed aspects.

FIG. 5 illustrates a blending system 500 that may reduce vibrations and/or generation of noise with respect to other blending systems, as well as provide an improved blending system as described herein. Blending system 500 may include a blending container 502, a blade assembly 520, bearing housing 530, a bearing mount 540, a first dampening member 550, and a second dampening member 556. As illustrated, the first dampening member 550 may isolate the bearing housing 530 from contact with the bearing mount 540. The second dampening member 556 may be positioned to isolate at least a portion of the bearing mount 540 from contact with at least a portion of the blending container 502. For instance, the second dampening member 556 may be positioned between the bearing mount 556 and a closed end 512 of blending container 502. In an aspect, the second dampening member 556 may isolate the bearing mount 556 from contact with an aperture 508 of the closed end 512.

Second dampening member 556 and first dampening member 550 may comprise the same or different material. For instance, the second dampening member 556 and first dampening member 550 may comprise a rubber material that is compressed to isolate components from direct contact with other components. In an example, a portion of the second dampening member 556 may be exposed to in the cavity 504 of the blending container 502 and may comprise a food grade material and/or may be coated with a protective layer. In another example, the second dampening member 556 may be covered or not exposed in the cavity 504.

For instance, the first dampening member 550 may isolate the bearing housing 530 from contact with the bearing mount 540 and/or from contact with the blending container 502. Isolation from contact may alter (e.g., reduce, prevent, etc.) transmission of vibrations and/or specific vibrations, such as those having properties that may be absorbed by the first dampening member 550. In another aspect, the second dampening member 556 may similarly isolate the bearing mount 540 from contact with the blending container 502. As transmission of vibrations are altered (e.g., reduced, dampened, etc.) from the bearing housing 530 to the bearing mount 540, the transmission of vibrations may be further altered (e.g., reduced, dampened, etc.) from the bearing mount 540 to the blending container 502. In another aspect, the first dampening member 550 and second dampening member 556 may alter (e.g., reduce, dampen, etc.) transmission of vibrations from the blending container 502, a motor, or the like.

It is noted that bearing mount 540 may comprise a stiffening member as described herein. It is further noted that the bearing mount 540 may be appropriately sized to mount the bearing housing 530 to the blending container 502. As such, the size and shape of the bearing mount 540 may depend, at least in part, on the configuration of the bearing housing 530 and the blending container 502. While embodiments describe bearing housing 530 as being a separate component from bearings 532, it is noted that the bearing housing 530 and bearings 532 may comprise a single component. It is further noted that the various described embodiments may comprise any number of bearings.

In another aspect, it is noted that a blade assembly may be attachable to a blending container, such as in single serving blending containers. As such, bearing mounts may be attached to the blade assembly, which may be attached to the blending container. Such embodiments are considered within the scope and spirit of this disclosure.

Figure 6:
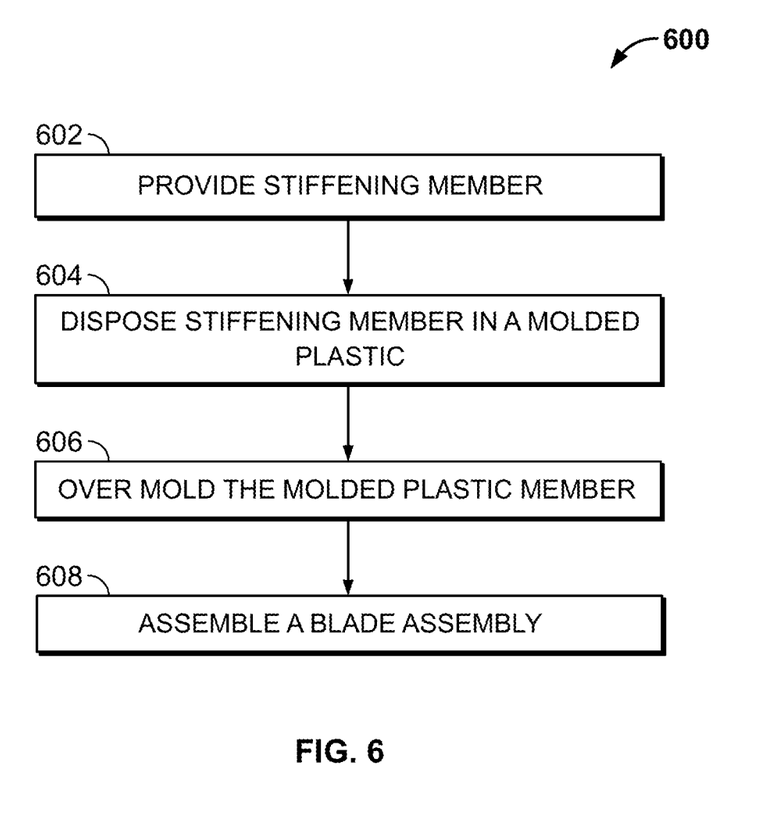
FIG. 6 is a flow diagram of an exemplary method associated with a blending system, in accordance with various disclosed aspects.

In view of the subject matter described herein, methods that may be related to various embodiments may be better appreciated with reference to the flowchart of FIG. 6. While the methods are shown and described as a series of blocks, it is noted that associated methods or processes are not limited by the order of the blocks. It is further noted that some blocks and corresponding actions may occur in different orders and/or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

FIG. 6 illustrates a flow diagram of an exemplary method 600 associated with a blade assembly. For instance, method 600 may provide for manufacturing or assembly of a blade assembly having a thick and stiffening bearing (e.g., bearing mount 114). It is noted that various acts may be performed by a user and/or a manufacturing system, such as an automated manufacturing system.

At reference numeral 602, the method may comprise providing a stiffening member. The stiffening member may include a generally stiff material. At reference numeral 604, the method may comprise disposing the stiffening member in a molded plastic. In an aspect, disposing the stiffening member in the molded plastic may include depositing the stiffening member in molded plastic, molding plastic around the stiffening member, or the like. The stiffening member, however, may be formed of any appropriate material, including, without limitation, rubber, plastic, metal or a combination of such.

At reference numeral 606, the method may comprise over molding the molded plastic member. For instance, the molded plastic member (which may include the stiffening member disposed therein) may be over molded with a plastic, such as by way of a non-limiting example a transparent plastic. At reference numeral 608, the method may comprise assembling a blade assembly. For instance, the bearing may be attached to an axle, blade assembly, blending container, or the like.

Although the embodiments of this disclosure have been illustrated in the accompanying drawings and described in the foregoing detailed description, it is to be understood that the present disclosure is not to be limited to just the described embodiments, but that the embodiments described herein are capable of numerous rearrangements, modifications and substitutions without departing from the scope of the claims hereafter. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define a blending system. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. The claims as follows are intended to include all modifications and alterations insofar as they come within the scope of the claims or the equivalent thereof.

What is claimed is:

1. A blending system, comprising:
a blending container;
a blade assembly, attachable to the blending container, comprising an axle;
at least one bearing disposed about the axle;
a bearing mount operatively attached to the blending container; and
a dampening member circumscribing at least a portion of the bearing, the dampening member isolating the at least one bearing from the bearing mount altering transmission of vibration from the at least one bearing to the bearing mount.

2. The blending system of claim 1, wherein the dampening member comprises at least one of an elastic or viscoelastic material.

3. The blending system of claim 2, wherein the dampening member comprises a rubber sleeve.

4. The blending system of claim 1, wherein the dampening member is compressed between the at least one bearing and the blending container.

5. The blending system of claim 1, further comprising:
a bearing housing operatively housing the at least one bearing, wherein the bearing mount operatively mounts the bearing housing to the blending container.

6. The blending system of claim 5, wherein the dampening member is compressed between the bearing housing and the bearing mount.

7. The blending system of claim 5, further comprising:
another dampening member configured to isolate at least a portion of the bearing mount from contact with at least a portion of the blending container.

8. A bearing assembly for a blending system, the bearing assembly comprising:
a bearing housing a bearing, the bearing configured to restrict movement of an axle of a blade assembly of the blending system;
a bearing mount configured to mount the bearing housing to a blending container of the blending system; and
a dampening member disposed between at least a portion of the bearing housing and at least a portion of the bearing mount, wherein the dampening member circumscribes at least a portion of the bearing housing.

9. The bearing assembly of claim 8, wherein the dampening member is operatively compressed between at least a portion of the bearing housing and at least a portion of the bearing mount.

10. The bearing assembly of claim 8, wherein the dampening member comprises a coating deposited on at least one of the bearing housing, the dampening member, or the blending container.

11. The bearing assembly of claim 8, wherein the dampening member comprises at least one of a foam, gel, or rubber material.

12. The bearing assembly of claim 8, wherein the bearing housing is further configured to house at least one other bearing.

13. The bearing assembly of claim 8, wherein the bearing mount includes a body comprising a first material, and a stiffening member comprising a second material.

14. The bearing assembly of claim 13, wherein the second material is generally stiffer than the first material.

15. A bearing assembly for a blending system, comprising:
a bearing mount operatively attachable to a blending container, wherein the bearing mount comprises:
a body comprising a first material; and
a stiffening member comprising a second material; and
at least one bearing operatively disposed about an axle of a blade assembly of the blending system,
wherein the bearing mount operatively mounts the at least one bearing to a container of the blending system;
a dampening member disposed between the at least one bearing and the bearing mount, the dampening member circumscribing at least a portion of the at least one bearing.

16. The bearing assembly of claim 15, wherein the first material comprises a plastic that overmolds the stiffening member.

17. The bearing assembly of claim 16, wherein the body further comprises a third material deposited on the first material.

18. The bearing assembly of claim 15, wherein the second material comprises a material having a greater rigidity than the first material.

19. The bearing assembly of claim 15, wherein the bearing mount operatively attaches to the container via at least one fastener.

\* \* \* \* \*